(12) United States Patent
Tanaka

(10) Patent No.: US 8,208,353 B2
(45) Date of Patent: Jun. 26, 2012

(54) DISK APPARATUS

(75) Inventor: Yukinobu Tanaka, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 278 days.

(21) Appl. No.: 12/578,668

(22) Filed: Oct. 14, 2009

(65) Prior Publication Data

US 2010/0232275 A1   Sep. 16, 2010

(30) Foreign Application Priority Data

Mar. 16, 2009   (JP) ................................. 2009-062238

(51) Int. Cl.
*G11B 7/00* (2006.01)

(52) U.S. Cl. ................ 369/44.28; 369/44.32; 369/53.13

(58) Field of Classification Search ................ 369/44.28
See application file for complete search history.

(56) References Cited

U.S. PATENT DOCUMENTS

| | | | |
|---|---|---|---|
| 6,298,019 B1 | 10/2001 | Watanabe et al. | |
| 7,333,412 B2 * | 2/2008 | Manoh et al. | 369/53.23 |
| 7,778,129 B2 * | 8/2010 | Nabeta | 369/53.28 |
| 2006/0120229 A1 | 6/2006 | Nabeta | |

FOREIGN PATENT DOCUMENTS

| | | |
|---|---|---|
| CN | 1805022 | 7/2006 |
| JP | 09-326123 | 12/1997 |
| JP | 2003-296945 | 10/2003 |

* cited by examiner

*Primary Examiner* — Aristotelis Psitos
(74) *Attorney, Agent, or Firm* — Antonelli, Terry, Stout & Kraus, LLP.

(57) ABSTRACT

Stable interlayer jump is realized by judging whether a signal is a false signal caused by noises, stray light, or interference of an adjacent layer or a true FE signal.

4 Claims, 18 Drawing Sheets

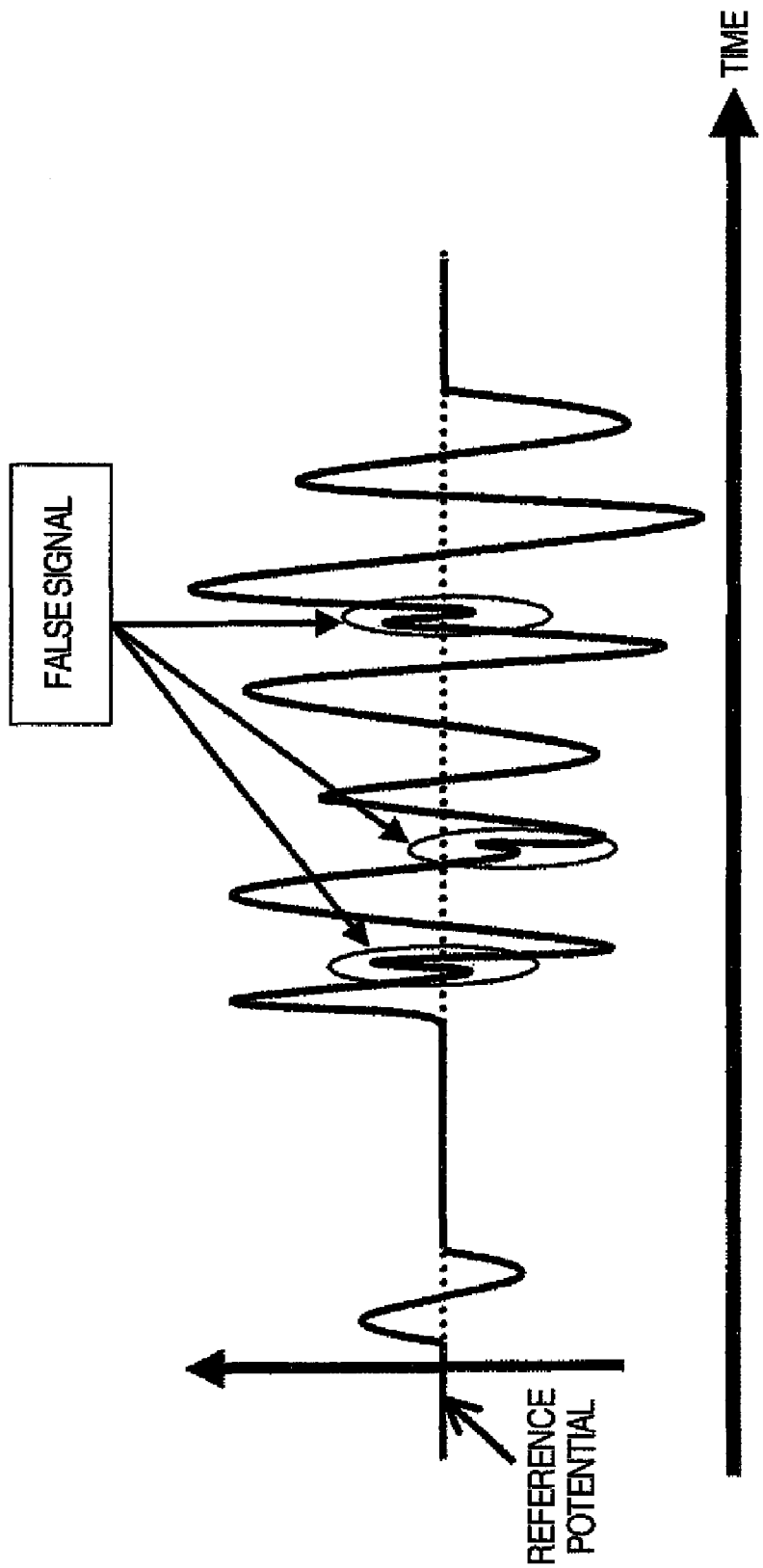

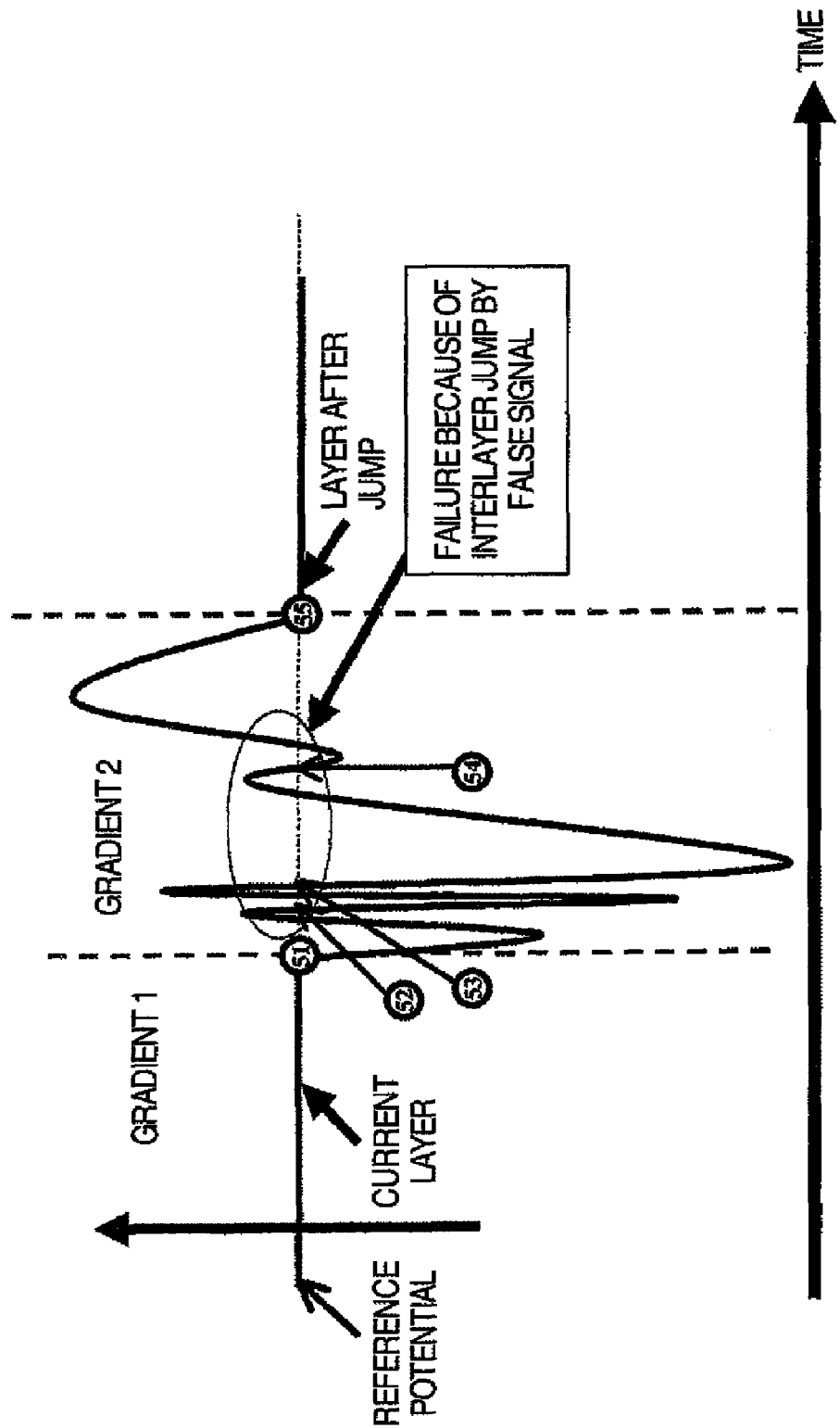

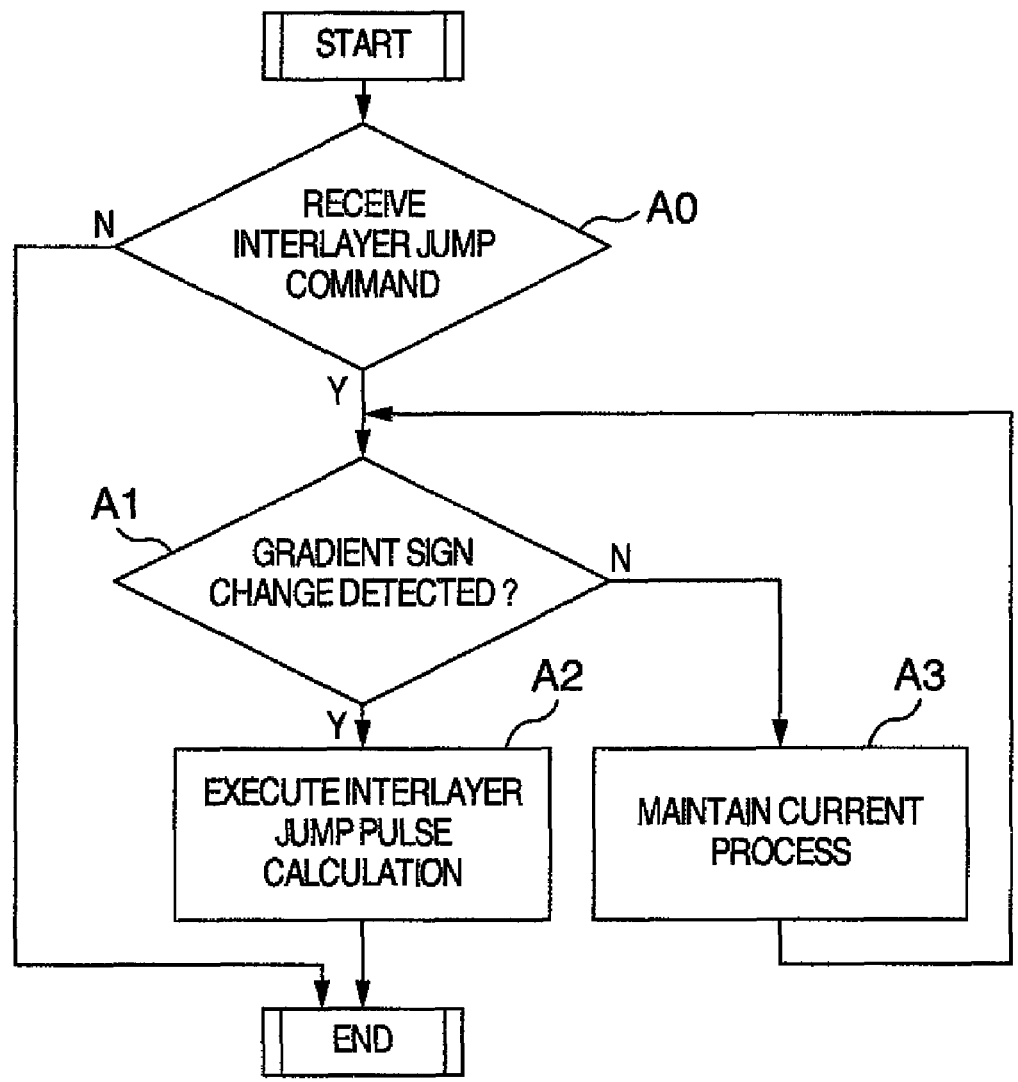

DISK APPARATUS

INCORPORATION BY REFERENCE

The present application claims priority from Japanese application JP2009-062238 filed on Mar. 16, 2009, the content of which is hereby incorporated by reference into this application.

BACKGROUND OF THE INVENTION

The present invention relates to a disk apparatus, and more particularly to an optical disk apparatus capable of interlayer jump between laminated information planes by alleviating the influence of false signals to be caused by noises or stray light.

There are disclosed techniques regarding interlayer jump of an optical disk apparatus.

For example, JP-A-9-326123 describes that "focus control is performed at an information plane where convergence of an optical beam reaches first while the optical beam is moved away from a disk from the uppermost point (CD) or while the optical beam is moved toward a disk from the lowermost point (DVD) to complete pull-in. Thereafter, focus control is inactivated once and a convergence lens is accelerated or decelerated to move to the next information plane in accordance with a level of the FE signal and a pull-in level set at each information plane".

JP-A-2003-296945 describes that "jump pulse generator means makes an output of an acceleration pulse of focus jump means terminate if a result of the whole reflection light detector means during acceleration pulse output becomes larger than a predetermined result"; and that "jump pulse generator means makes a deceleration pulse output of the focus jump means start if a result of the whole reflection light detector means during standby of a deceleration pulse output becomes larger than a predetermined result".

SUMMARY OF THE INVENTION

The techniques described in JP-A-9-326123 are associated with a problem that if a signal generated by stray light or noises of an adjacent information layer of a multi-layer optical disk is added to a focus error signal and a false signal is generated, interlayer jump may fail.

With the techniques described in JPA-2003-296945, output timings of an acceleration pulse and deceleration pulse used as a control signal for a focus jump signal are controlled in accordance with an amplitude of a whole reflection light amount signal.

However, it is necessary to consider a variation in amplitude of a whole reflection light amount signal and a focus error signal to be caused by interlayer leakage between multi layers.

It is an object of the present invention to provide a disk apparatus having improved reliability of interlayer jump.

The above-described issue can be settled by the inventions described, for example, in CLAIMS.

According to the present invention, it is possible to provide a disk apparatus having improved reliability of interlayer jump.

Other objects, features and advantages of the invention will become apparent from the following description of the embodiments of the invention taken in conjunction with the accompanying drawings.

BRIEF DESCRIPTION OF THE DRAWING

FIG. 16 is a graph illustrating an example of an FE signal waveform to be stored in a waveform obtaining memory for an FE signal.

FIG. 17 is a diagram illustrating operation waveforms of the fifth embodiment.

FIG. 18 is a flow chart illustrating the outline operation of the first embodiment.

DETAILED DESCRIPTION OF THE INVENTION

An optical disk apparatus is used by way of example as an apparatus for embodying the present invention. The constitution herein described is only illustrative and is not limited thereto.

[First Embodiment]

Figure 1:
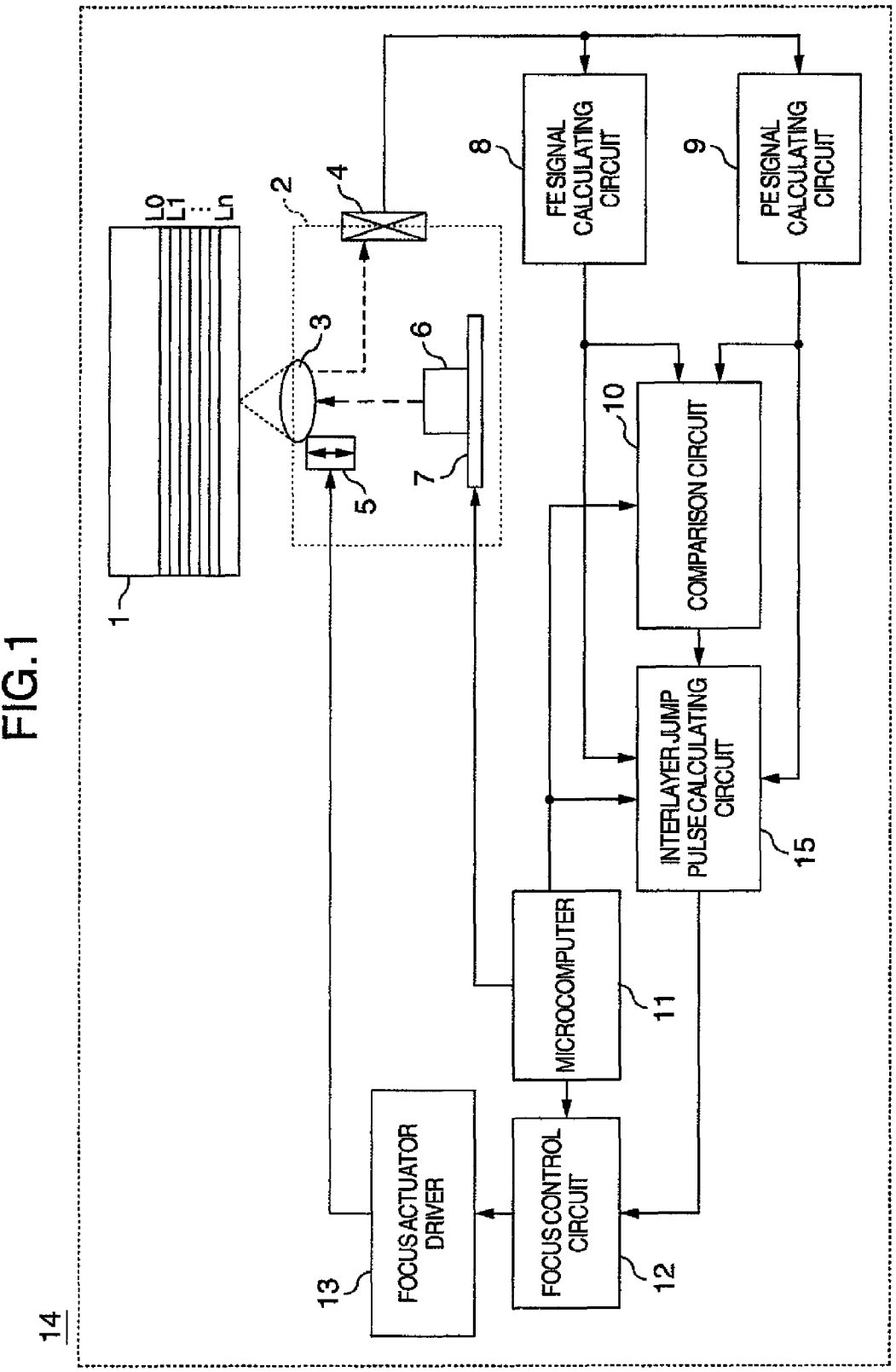
FIG. 1 is a block diagram illustrating an optical disk apparatus according to a first embodiment.

A block diagram of an optical disk apparatus 14 of the first embodiment is illustrated in FIG. 1.

FIG. 1 is a block diagram illustrating an example of an optical disk apparatus capable of reliably performing interlayer jump in an optical disk 1 having a plurality of reproducing/recording layers (represented by Lo L1, . . . , Ln as illustrated in FIG. 1), by alleviating the influence of a false signal caused by noises, stray light or the like in each layer.

Referring to FIG. 1, the optical disk 1 has a plurality of reproducing/recording layers. An optical pickup 2 is provided in correspondence with the optical disk 1. The optical pickup 2 includes a laser light source 6, a laser emission control circuit 7, an objective lens 3, a photodetector 4, and a focus actuator 5. The laser beam emission control circuit 7 controls emission and quenching of the laser light source 6. The objective lens 3 irradiates a laser beam from the laser light source 6 to the optical disk 1, and converges the irradiated laser beam on the optical disk 1. The photodetector 4 photoelectrically converts the optical beam reflected from the optical disk 1 into an electrical signal.

A focus error signal calculating circuit 8 and a pull-in error signal calculating circuit 9 generates from the electrical signals obtained from the photodetector 4 a focus error signal (hereinafter abbreviated into an FE signal) and a pull-in error signal (hereinafter abbreviated into a PE signal). The FE signal represents a converged state of light on a reproducing/recording layer of the optical disk 1, whereas the PE signal represents a total amount of reflected light.

A focus control circuit 12 generates a focus control signal for controlling the focus actuator 5 via a focus actuator driver 13 to move the focus actuator in a direction (hereinafter called a focus direction) perpendicular to the reproducing/recording layer of the optical disc 1.

A microcomputer 11 controls the entirety of the optical disk apparatus 14

An FE signal/PE signal comparison circuit 10 (hereinafter abbreviated into a signal comparison circuit) judges or detects whether a signal is a false signal caused by stray light, noises or the like or a true FE signal, to perform reliable interlayer jump, by calculating change points (from positive to negative, from negative to positive) of signs of gradients of the FE and PE signals, and comparing the change points of the FE and PE signals. The gradient and sign are acquired, for example, by differentiating the FE or PE signal at the signal comparison circuit 10.

If the FE signal is detected as the false signal, the microcomputer 11 or focus control circuit 12 controls in such a manner that a focal position (zero cross point) crossing an offset value of the FE signal is not detected as the focal position of the information plane of the optical disk 1. If the FE signal is detected as a true FE signal, the microcomputer 11 or focus control circuit 12 controls in such a manner that a zero cross point of the FE signal is detected as the position of the information plane of the optical disk 1. If a laser beam is focused on a target information plane, the microcomputer 11 controls in such a manner that information is recorded or reproduced at this position. If the FE signal is a false signal, i.e., if a laser beam is not focused on a target plane, the microcomputer 11 controls in such a manner that information is not recorded or reproduced at this position. The offset value of the FE signal is a value when the FE signal is focused on the information plane. "Crossing" means that a sign of a difference between two signals changes from positive to negative or from negative to positive.

An interlayer jump calculating circuit 15 generates an interlayer jump pulse in accordance with the calculation result by the signal comparison circuit 10.

The PE signal and a gradient of the PE signal are less influenced by temporary external disturbance than the FE signal. Therefore, by utilizing a gradient of the PE signal, it becomes possible to detect whether an abrupt variation in FE signal is caused by temporary external disturbance or not. Although the signal comparison circuit 10 acquires a gradient of the PE signal, the embodiment is not limited thereto, but a moving average of the PE signal may be calculated and a gradient of the moving average is acquired. By utilizing the moving average, a resistance against temporary external disturbance can be improved further.

With reference to the flow chart of FIG. 18, description will now be made on the outline of interlayer jump regarding the optical disk apparatus 14.

First, at Step A0 an interlayer jump command issued from the microcomputer 11 is received by the interlayer jump calculating circuit 15 and signal comparison circuit 10. Next, at Step A1 it is judged whether the signal comparison circuit 10 detects a gradient sign change in FE and PE signals. If a gradient sign change is detected at Step A1, the interlayer jump pulse calculating circuit 15 executes interlayer jump pulse calculation to generate an acceleration or deceleration pulse (inputs are, for example, three signals of the FE signal, PE signal and a process result by the signal comparison circuit 10). If a gradient sign change is not detected at Step A1, the interlayer jump pulse calculating circuit 15 executes calculation to maintain the present process. The feature of the optical disk apparatus 14 resides in that interlayer jump is performed by generating an acceleration or deceleration pulse in accordance with the process result by the signal comparison circuit 10.

Figure 2:
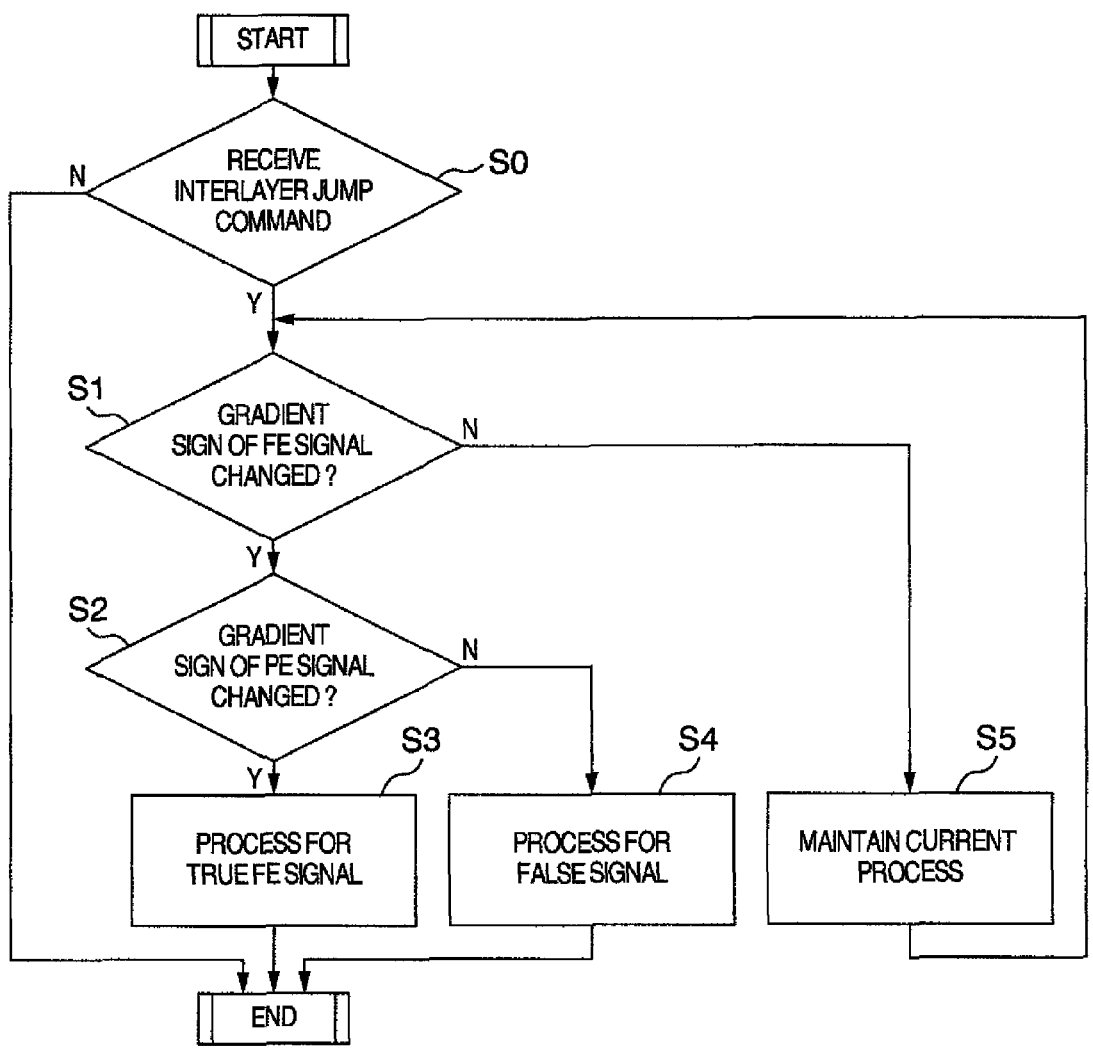
FIG. 2 is a flow chart illustrating the operation of the first embodiment.
Figure 3:
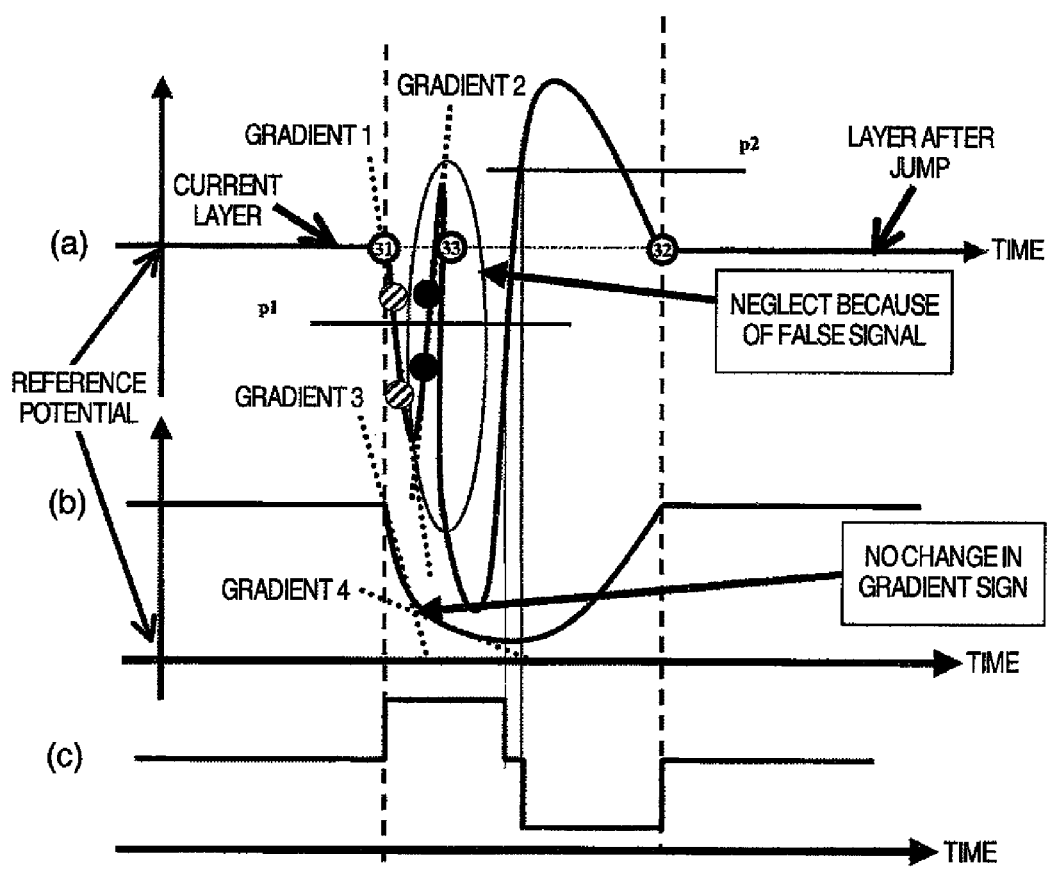
FIG. 3 is a diagram illustrating operation waveforms of the first embodiment.

Next, with reference to the flow chart of FIG. 2 and the graph of FIG. 3 illustrating operation waveforms, description will be made on the process to be executed by the signal comparison circuit 10 in order to reliably perform interlayer jump by alleviating the influence of a false signal caused by noises, stray light or the like.

First, upon reception of the interlayer jump command at Step S0 in FIG. 2, the interlayer jump pulse calculating circuit 15 generates an acceleration pulse in accordance with a jump direction. Next, at Step S1 the signal comparison circuit 10 acquires a change point of a gradient sign of the FE signal. In this specification, the word "point" is intended to include a substantial range or region considering that a measured value has an error of, e.g., an upper and lower 1% of a target value. Next, at Step S2 it is checked whether a gradient sign of the PE signal changes at the change point of the gradient sign of the FE signal.

With reference to FIG. 3, description will be made on a signal change for interlayer jump. In FIG. 3, the FE signal generated by the FE signal calculating circuit 8 is represented by (a). The PE signal generated by the PE signal calculating circuit 9 is represented by (c). A conventional process is executed on the assumption that an in-focus state for a particular layer exists on a point (hereinafter called zero cross point) crossing the offset value of the FE signal from a positive value or negative value. In jumping from a current layer 31 to the next layer as indicated by the FE signal (a), the FE signal has a zero cross point caused by noises or stray light. This false signal detects an illusion layer 33 at a position indicated by a point 33. In this case, jump to a desired layer may fail.

On the other hand, the disk apparatus 14 of the embodiment uses gradients and gradient sign change points to judge whether a signal is a true FE signal acquired for each information plane or a false signal caused by noises or stray light. If a gradient sign of the PE signal (b) does not change at the point where a gradient sign of the FE signal (a) changes from negative (gradient 1) to positive (gradient 2) (an opposite relation is also applicable), the flow transits to Step S4. Because of the false signal, at Step S4 the signal comparison circuit 10 requests the interlayer jump pulse calculating circuit 15 to maintain the current signal state until the gradient sign changes. Conversely, if a gradient sign of the PE signal changes at Step S2, the flow transits to Step S3. At Step S3 the signal comparison circuit 10 processes by using the obtained FE signal as a true FE signal. More specifically, because of the true FE signal, the signal comparison circuit 10 outputs a request signal for generating an acceleration pulse and a deceleration pulse in accordance with threshold values p1 and p2 of the FE signal (a).

With the above processes, if the gradient sign of the FE signal changes and the gradient sign of the PE signal does not change, in a range of interlayer jump from one information plane to an adjacent information plane, then the microcomputer 11 or focus control circuit 12 controls not to detect a zero cross point of the FE signal in this range as a focal position of the adjacent information plane. With the process described above of the signal comparison circuit 10, it is controlled in such a manner that a zero cross point is detected as the focal position of an adjacent information plane, in a range where the gradient sign of the FE signal changes and the gradient sign of the PE signal changes also.

With the process described above of the signal comparison circuit 10, it becomes possible to generate a pulse indicated at (c) in FIG. 3 without being influenced by the false signal. If the gradient sign of the FE signal does not change at Step S1, the flow transits to Step S5 whereat a current process is maintained until the gradient of the FE signal changes.

This disk apparatus can be applied to various optical disks 1 including BD, HD DVD, DVD, and CD. The interlayer jump pulse calculating circuit 15 and signal comparison circuit 10 may be realized by using the calculation function of the microcomputer 11.

[Second Embodiment]

Figure 4:
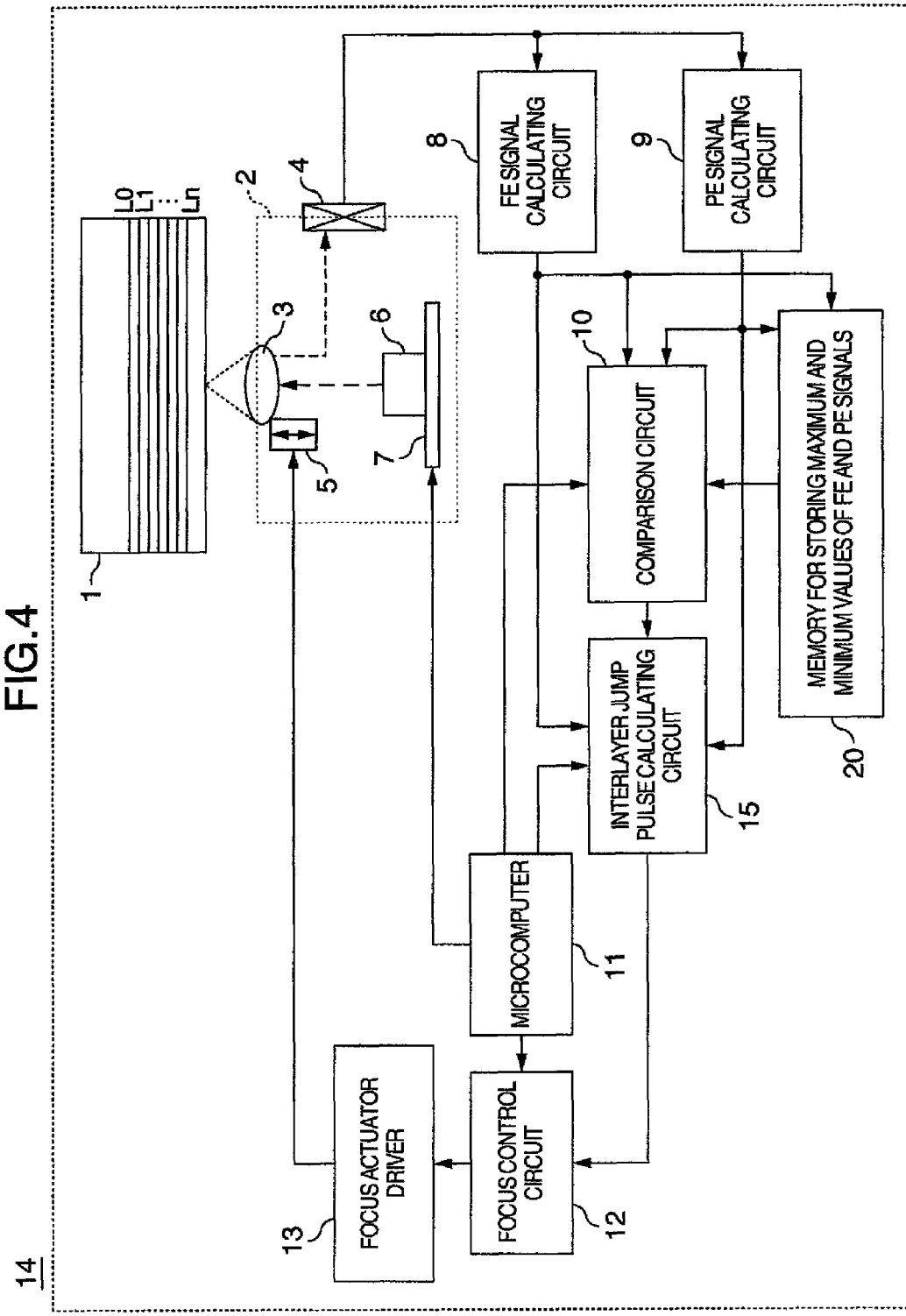
FIG. 4 is a block diagram illustrating an optical disk apparatus according to a second embodiment.

FIG. 4 is a block diagram illustrating an optical disk apparatus 14 of the second embodiment.

Figure 5:
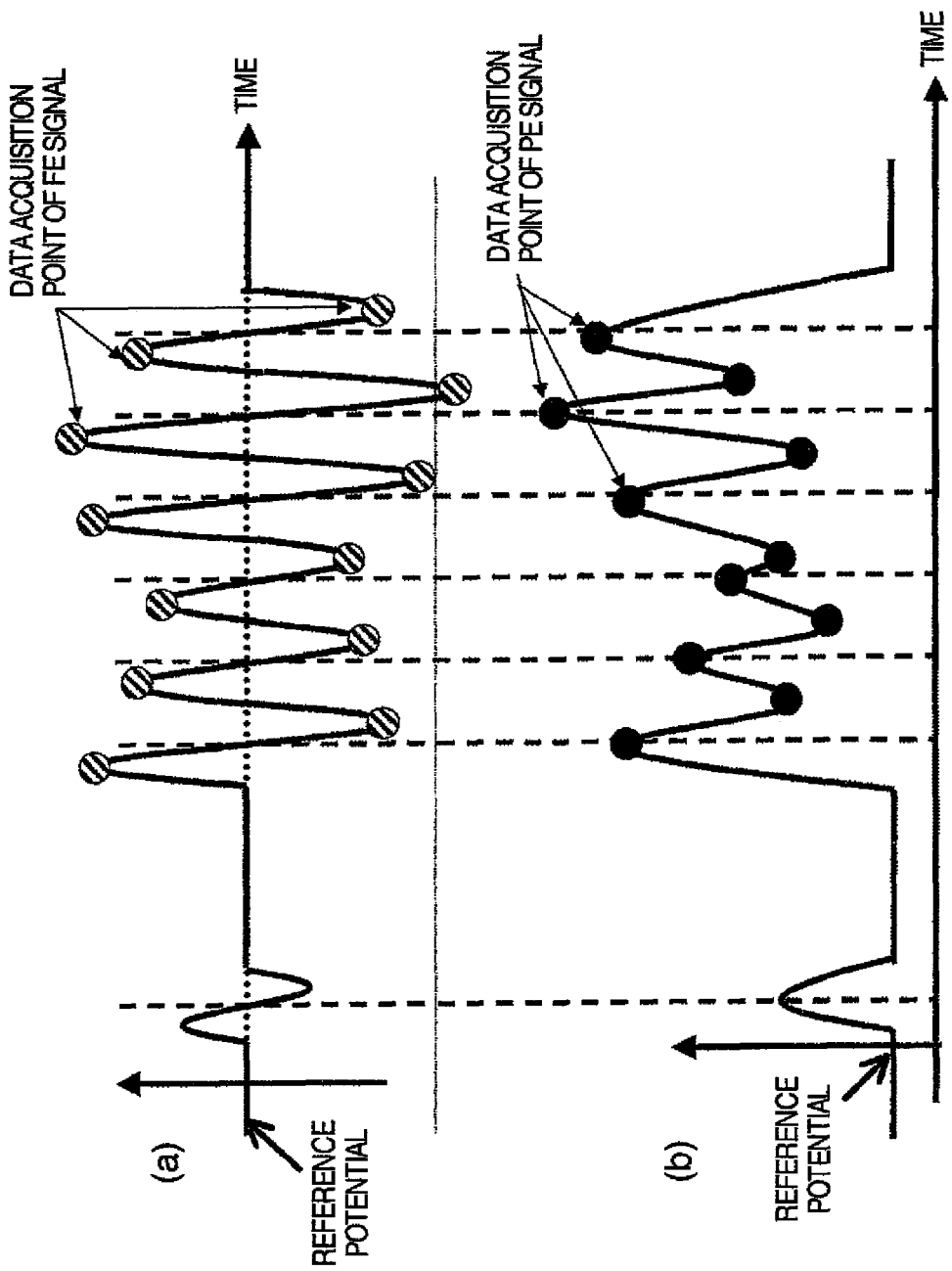
FIG. 5 is a graph illustrating examples of a maximum value and a minimum value of an FE signal and a PE signal to be stored in memories for the FE and PE signals.

The optical disk apparatus illustrated in FIG. 4 has the constitution that a memory 20 for storing maximum values and minimum values of the FE and PE signals is added to the constitution of the first embodiment. Maximum and minimum values to be stored in the memory 20 will be described with reference to FIG. 5. The FE signal generated by the FE signal calculating circuit 8 is indicated at (a) in FIG. 5. The PE signal generated by the PE signal calculating circuit 9 is indicated at (b) in FIG. 5. In FIG. 5, measured points of the FE signal include points of maximum and minimum values at each layer, and measured points of the PE signal include points of maximum and minimum values at each layer. The value at each measured point is stored in the memory 20 (in this case, only minimum values or maximum values may be stored selectively). In this specification, the maximum and minimum values are the maximum and minimum values of the signal at each layer. Further, in this specification, the maximum and minimum values are not the maximum and minimum values of an actual signal, but the maximum and minimum values are the measured maximum and minimum valises. Furthermore, in this specification, the maximum and minimum values are not limited only to the measured maximum and minimum values, but the maximum and minimum values may included in a range of upper and lower 1% of the measured maximum and minimum values.

The feature of the optical disk apparatus 14 resides in that the interlayer jump pulse calculating circuit 15 generates an acceleration or deceleration pulse in accordance with the process results by the signal comparison circuit 10.

Figure 6:
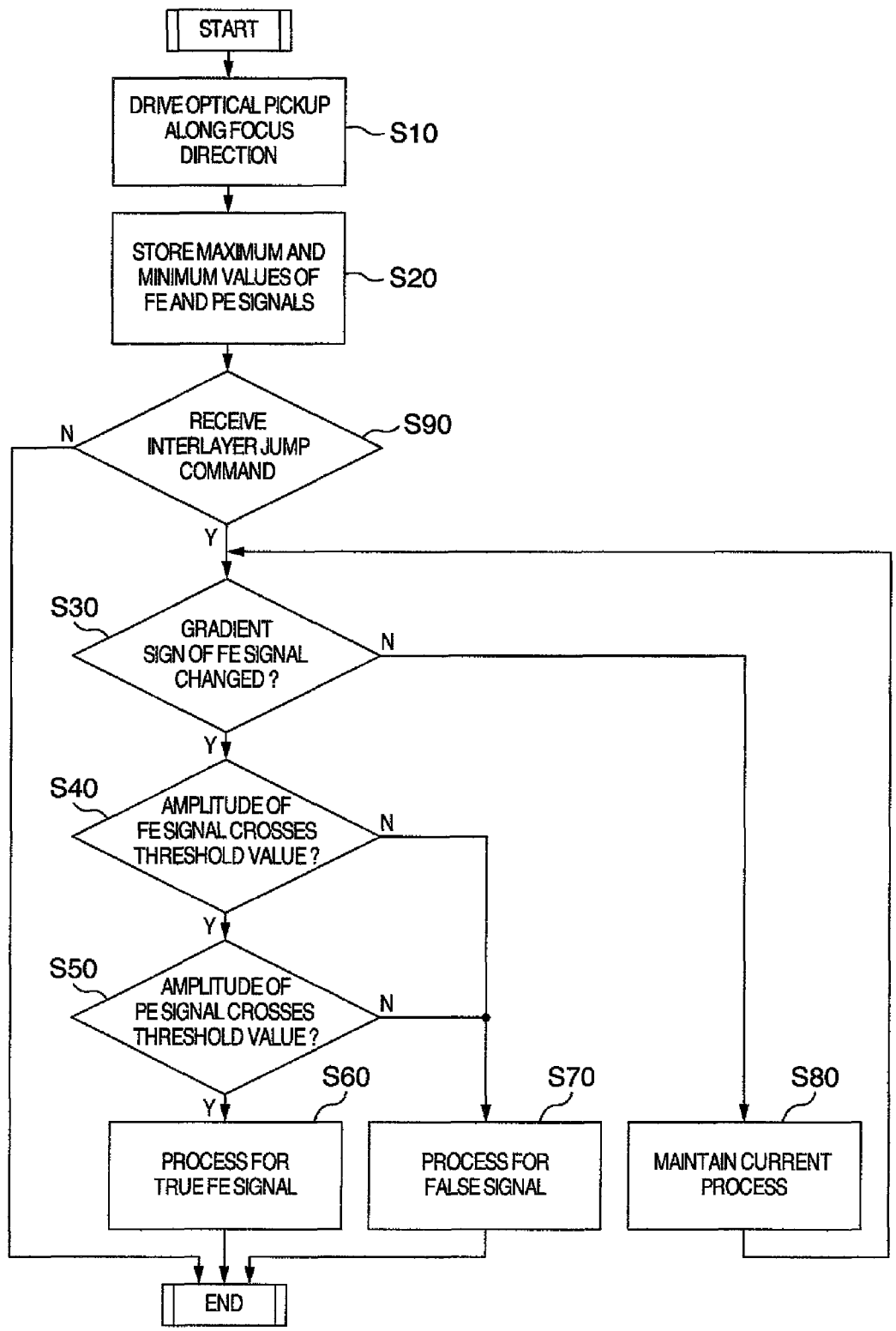
FIG. 6 is a flow chart illustrating the operation of the second embodiment.

With reference to the flow chart of FIG. 6 and operation waveforms of FIG. 7, description will be made on the process to be executed by the signal comparison circuit 10.

First, at Step S10 the focus actuator 5 is driven to move the optical pickup along a focus direction (either a direction of moving toward the information plane or a direction of moving away from the information plane). With this process at Step S10, the waveforms illustrated in FIG. 5 are obtained. Next, at Step S20 maximum and minimum values of the waveforms are stored in the memory 20. Next, at Step S90 upon reception of the interlayer jump command issued from the microcomputer 11, the interlayer jump pulse calculating circuit 15 and signal comparison circuit 10 start the interlayer jump process. The interlayer jump pulse calculating circuit 15 generates an acceleration pulse in accordance with a direction along which a desired layer to be interlayer-jumped exists.

Figure 7:
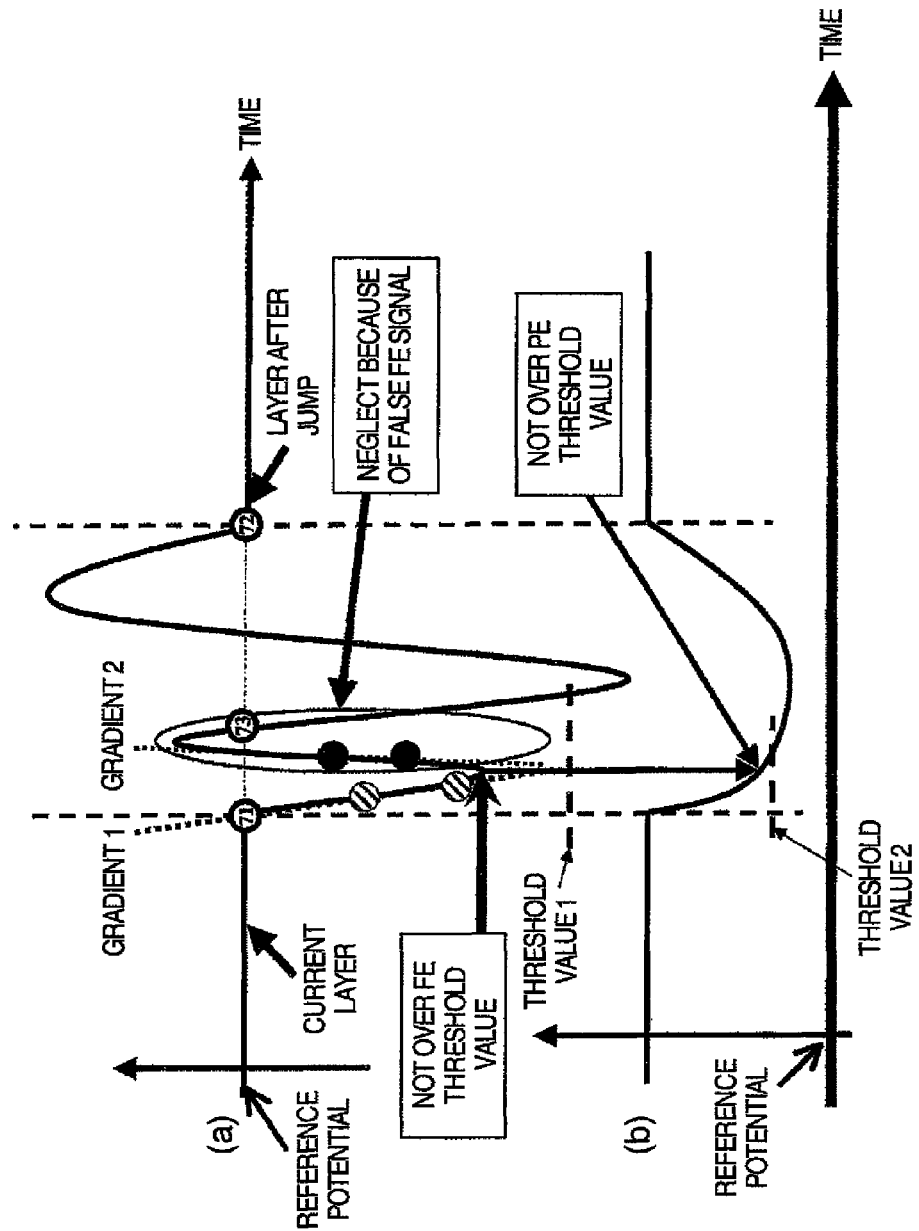
FIG. 7 is a diagram illustrating operation waveforms of the second embodiment.

As the interlayer jump process starts, operation waveforms illustrated in FIG. 7 are obtained. The waveform of the FE signal generated by the FE signal calculating circuit 8 is indicated at (a) in FIG. 7, and the waveform of the PE signal generated by the PE signal calculating circuit 9 is indicated at (b) in FIG. 7.

Next, at Step S30 the signal comparison circuit 10 detects whether a gradient sign of the FE signal changes from negative to positive (or from positive to negative). An example of a change of the gradient sign of the FE signal is indicated by a gradient 1 and a gradient 2 of the PE signal indicated at (a) in FIG. 7.

If Yes at Step S30, the signal comparison circuit 10 transits to the process at Step S40.

At Step S40 the signal comparison circuit 10 detects whether a change amount of the FE signal from a focal point exceeds a threshold value 1. The process at Step S40 is executed at a point where the gradient sign of the FE signal indicated at (a) in FIG. 7 changes. The threshold value 1 is determined in advance by the signal comparison circuit 10 from the maximum and minimum values of the FE signal stored in the memory 20. The threshold value 1 is set to, for example, 80% of a minimum value of the FE signal relative to the reference potential. If Yes at Step S40, the flow transits to Step S50.

At Step S50 the signal comparison circuit 10 detects whether a change amount of the PE signal from a focal point crosses a threshold value 2. The threshold value 2 is determined in advance by the signal comparison circuit 10, for example, from the maximum and minimum values of the PE signal at each layer. The threshold value 2 is set to, for example, 150% of a minimum value of the PE signal. If Yes at Step S50, the flow transits to Step S60.

At Step S60 the signal comparison circuit 10 processes by using the obtained FE signal as a true FE signal.

If No at Step 40 or Step 50, the process transits to Step S70. At Step S70 the signal comparison circuit 10 processes by using the obtained FE signal as a false FE signal.

If a gradient sign of the FE signal does not change at Step S30, the current signal state is maintained at Step S80 until the gradient sign changes.

With the above processes, even if the gradient sign of the FE signal changes and the gradient sign of the PE signal changes, if the FE or PE signal does not cross the threshold value, in a range of interlayer jump from one information plane to an adjacent information plane, then the microcomputer 11 or focus control circuit 12 controls not to detect a zero cross point of the FE signal in this range as a focal position of the adjacent information plane.

With the process described above, in jumping from a current layer 71 to the next layer 72 as indicated by the FE signal (a) of FIG. 7, interlayer jump to a desired layer becomes possible without erroneously jumping to an illusion layer 73 caused by a false signal.

As described above, the optical disk apparatus 14 judges whether a signal is a false signal or a true FE signal. It is therefore possible to generate acceleration/deceleration pulses from the true FE signal as indicated at (c) in FIG. 3. A threshold value of the optical disk apparatus 14 may be fixed to each layer or may be determined independently at each layer. In the embodiment, although an amplitude value of the PE signal is used, a gradient of the PE signal may also be used.

In the optical disk apparatus 14 of this embodiment, maximum and minimum values of the FE and PE signals are actually measured at each layer, and threshold values are determined in accordance with these maximum and minimum values. It is therefore possible to provide the optical disk apparatus 14 capable of performing proper interlayer jump by suppressing the influence of individual differences of reflection light such as manufacturers of the optical disk 1, and manufacture models.

This disk apparatus can be applied to various optical disks 1 including BD, HD DVD, DVD, and CD. The interlayer jump pulse calculating circuit 15 and signal comparison circuit 10 may be realized by using the calculation function of the microcomputer 11. The timing when the maximum and minimum values of the FE and PE signals are stored in the memory 20 may be any time before interlayer jump, and this storage process is not required to be an independent process, but may be executed in common with another process. The memory 20 is not required to be an external memory, but it may be realized by using a portion of an internal memory of the microcomputer 11.

[Third Embodiment]

Figure 8:
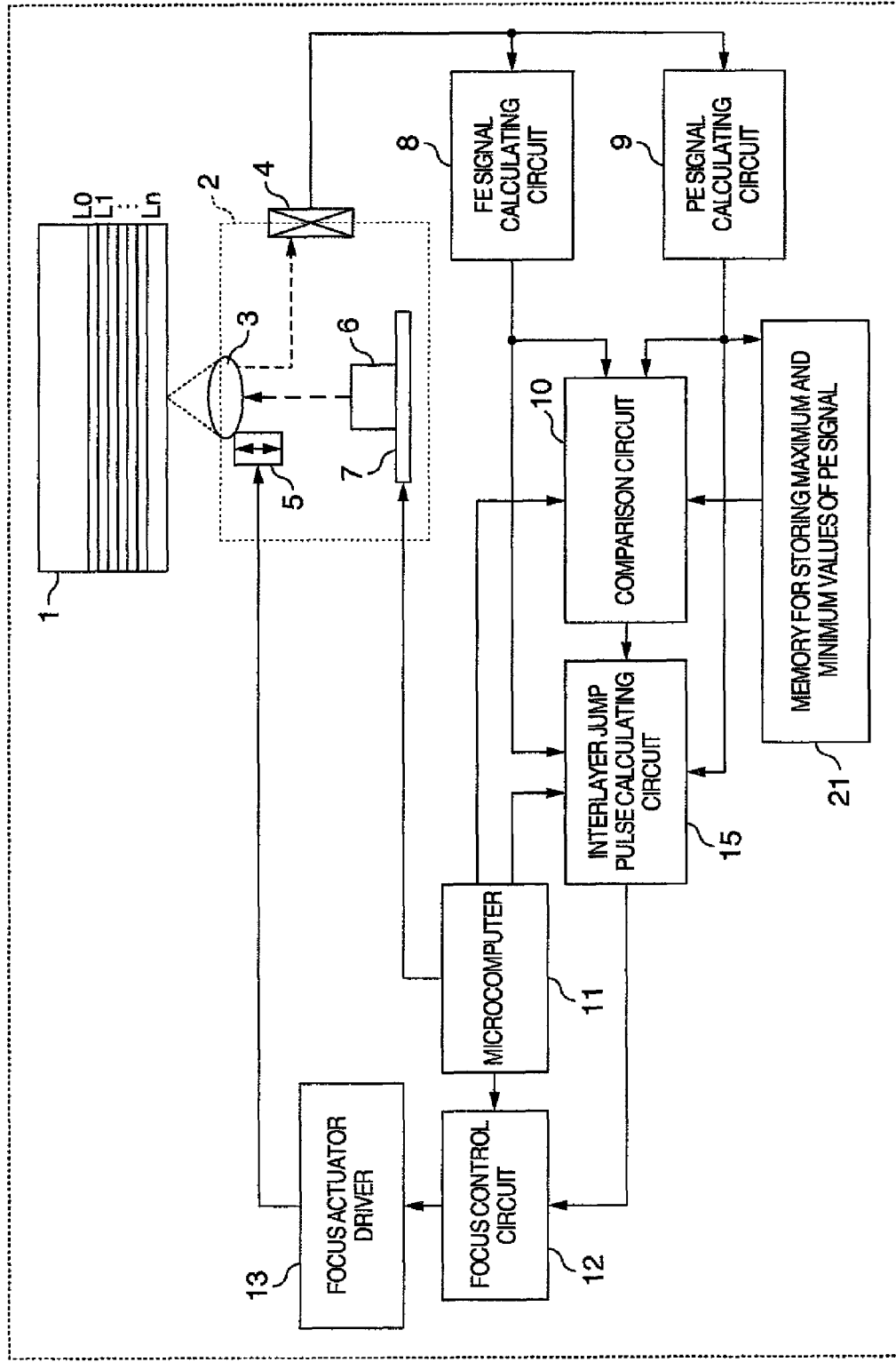
FIG. 8 is a block diagram illustrating an optical disk apparatus according to a third embodiment.

FIG. 8 is a bock diagram of an optical disk apparatus 4 of the third embodiment.

In the second embodiment, the memory 20 stores the values of both the FE and PE signal. In contrast, a memory 21 for storing maximum and minimum values (hereinafter simply memory 21) of the third embodiment stores the values of only the PE signal. With reference to the PE signal indicated at (b) of FIG. 5, description will be made on the maximum and minimum values (only maximum values, only minimum values, or maximum values or minimum values may be selectively used) stored in the memory 21. The waveform of the PE signal generated by the PE signal calculating circuit 9 is indicated at (b) of FIG. 5. In FIG. 5, measured points of the PE signal correspond to maximum and minimum values of the PE signal at each layer, and the values at the measured points are stored in the memory 21.

The feature of the optical disk apparatus 14 resides in that the interlayer jump pulse calculating circuit 15 generates an acceleration or deceleration pulse in accordance with the process results by the signal comparison circuit 10.

Figure 9:
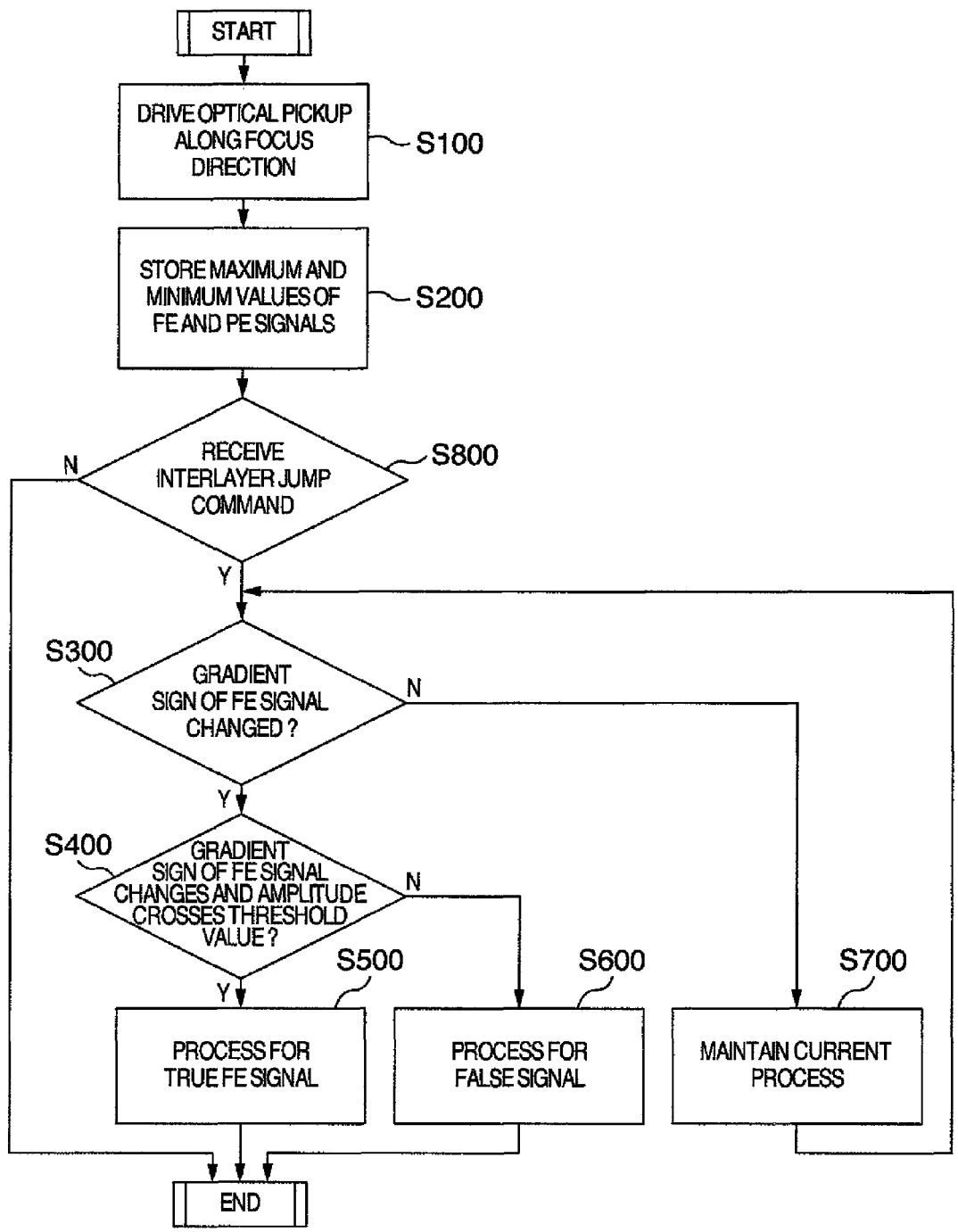
FIG. 9 is a flow chart illustrating the operation of the third embodiment.

With reference to the flow chart of FIG. 9 and operation waveforms of FIG. 10, description will be made on the process to be executed by the signal comparison circuit 10 with the memory 21.

First, at Step S100 the focus actuator 5 is driven to move the optical pickup along a focus direction (either a direction of moving toward the information plane or a direction of moving away from the information plane), and at Step S200 maximum and minimum values obtained from the waveform illustrated at (b) of FIG. 5 are stored in the memory 21. Next, at Step S800 upon reception of the interlayer jump command issued from the microcomputer 11, the interlayer jump pulse calculating circuit 15 and signal comparison circuit 10 start the interlayer jump process. The interlayer jump pulse calculating circuit 15 generates an acceleration pulse in accordance with a direction along which a desired layer to be interlayer-jumped exists.

Figure 10:
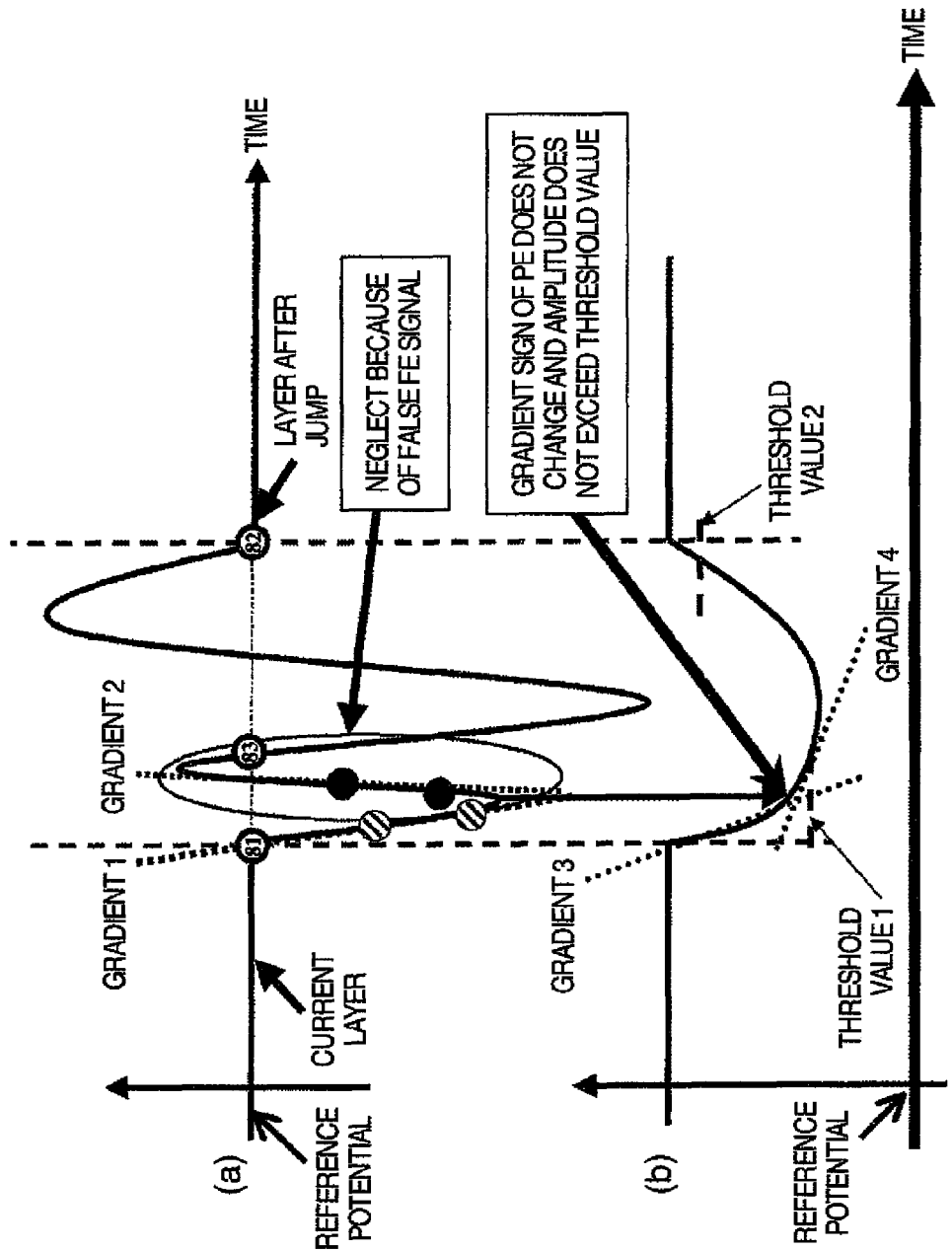
FIG. 10 is a diagram illustrating operation waveforms of the third embodiment.

As the interlayer jump process starts, operation waveforms illustrated in FIG. 10 are obtained. The waveform of the FE signal generated by the FE signal calculating circuit 8 is indicated at (a) in FIG. 10, and the waveform of the PE signal generated by the PE signal calculating circuit 9 is indicated at (b) in FIG. 10.

Next, at Step S300 the signal comparison circuit 10 detects whether a gradient sign of the FE signal changes from negative to positive (or from positive to negative). An example of a change of the gradient sign of the FE signal is indicated by a gradient 1 and a gradient 2 of the PE signal indicated at (a) in FIG. 10.

If Yes at Step S300, the signal comparison circuit 10 transits to the process at Step S400.

At Step S400 the signal comparison circuit 10 detects whether a change amount of the FE signal from a focal point exceeds a threshold value and the gradient sign changes. The process at Step S400 is executed at a point where the gradient sign of the FE signal indicated at (a) in FIG. 10 changes. The threshold value is determined in advance by the signal comparison circuit 10 from the maximum and minimum values of the PE signal stored in the memory 21. A threshold value 1 is set to, for example, 120% of a minimum value of the PE signal relative to the reference potential, and a threshold value 2 is set to, for example, 80% of a maximum value. If Yes at Step S400, the flow transits to Step S500.

At Step S500 the signal comparison circuit 10 processes by using the obtained FE signal as a true FE signal.

On the other hand, if No at Step S400, the process transits to Step S600. At Step S600 the signal comparison circuit 10 processes by using the obtained FE signal as a false FE signal.

If a gradient sign of the FE signal does not change at Step S300, the current signal state is maintained at Step S700 until the gradient sign changes.

With the above processes, even if the gradient sign of the FE signal changes and the gradient sign of the PE signal changes, if the PE signal does not cross the threshold value, in a range of interlayer jump from one information plane to an adjacent information plane, then the microcomputer 11 or focus control circuit 12 controls not to detect a zero cross point of the FE signal in this range as a focal position of the adjacent information plane.

With the processes described above, in jumping from a current layer 81 to the next layer 82 as indicated by the FE signal (a) of FIG. 10, interlayer jump to a desired layer becomes possible without erroneously jumping to a layer 83 caused by a false signal, because an acceleration or deceleration pulse can be generated in accordance with a true FE signal, as indicated at (c) of FIG. 3.

This disk apparatus can be applied to various optical disks 1 including BD, HD DVD, DVD, and CD. The interlayer jump pulse calculating circuit 15 and signal comparison circuit 10 may be realized by using the calculation function of the microcomputer 11. The timing when the maximum and minimum values of the FE and PE signals are stored in the memory 20 may be any time before interlayer jump, and this storage process is not required to be an independent process, but may be executed in common with another process. The memory 20 is not required to be an external memory, but may be realized, for example, by using a portion of an internal memory of the microcomputer 11.

[Fourth Embodiment]

Figure 11:
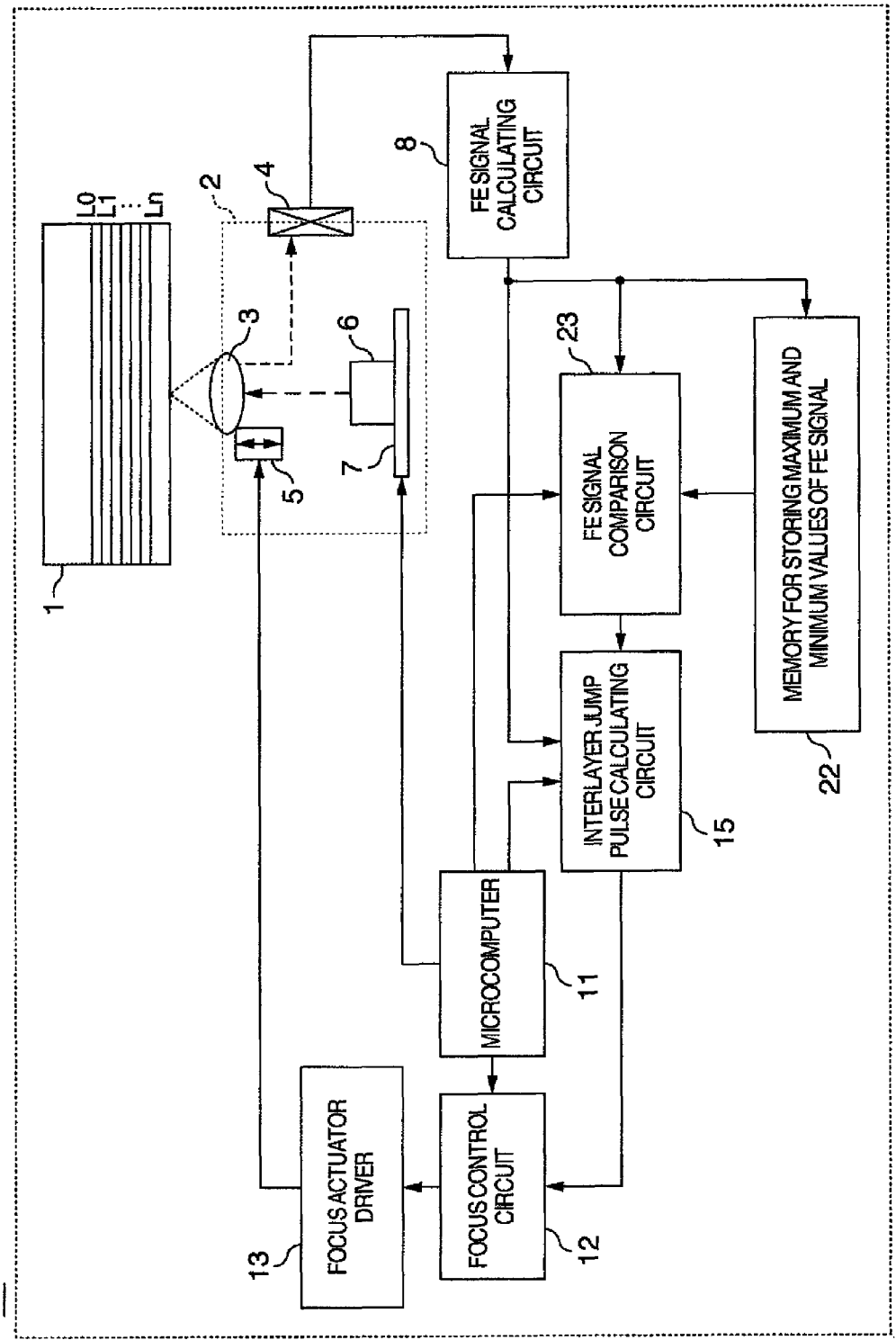
FIG. 11 is a block diagram illustrating an optical disk apparatus according to a fourth embodiment.

FIG. 11 is a bock diagram of an optical disk apparatus 14 of the fourth embodiment.

Different points of the fourth embodiment from the third embodiment are as follows. Namely, in the fourth embodiment, the PE signal calculating circuit 9 is not provided, the signal comparison circuit 10 is replaced with an FE signal comparison circuit 23, and a memory 22 for storing maximum and minimum values of the FE signal (hereinafter simply called memory 22) is provided although the memory 21 of the third embodiment stores the values of the PE signal.

With reference to the FE signal indicated at (a) of FIG. 5, description will be made on the maximum and minimum values (only maximum values, only minimum values, or maximum values or minimum values may be selectively used) stored in the memory 22. The waveform of the FE signal generated by the FE signal calculating circuit 8 is indicated at (a) of FIG. 5. In FIG. 5, measured points of the PE signal correspond to maximum and minimum values of the FE signal at each layer, and the values at the measured points are stored in the memory 22 (only maximum values, only minimum values, or maximum values or minimum values may be selectively used). The feature of the optical disk apparatus 14 resides in that the interlayer jump pulse calculating circuit 15 generates an acceleration or deceleration pulse in accordance with the process results by the FE signal comparison circuit 23.

Figure 12:
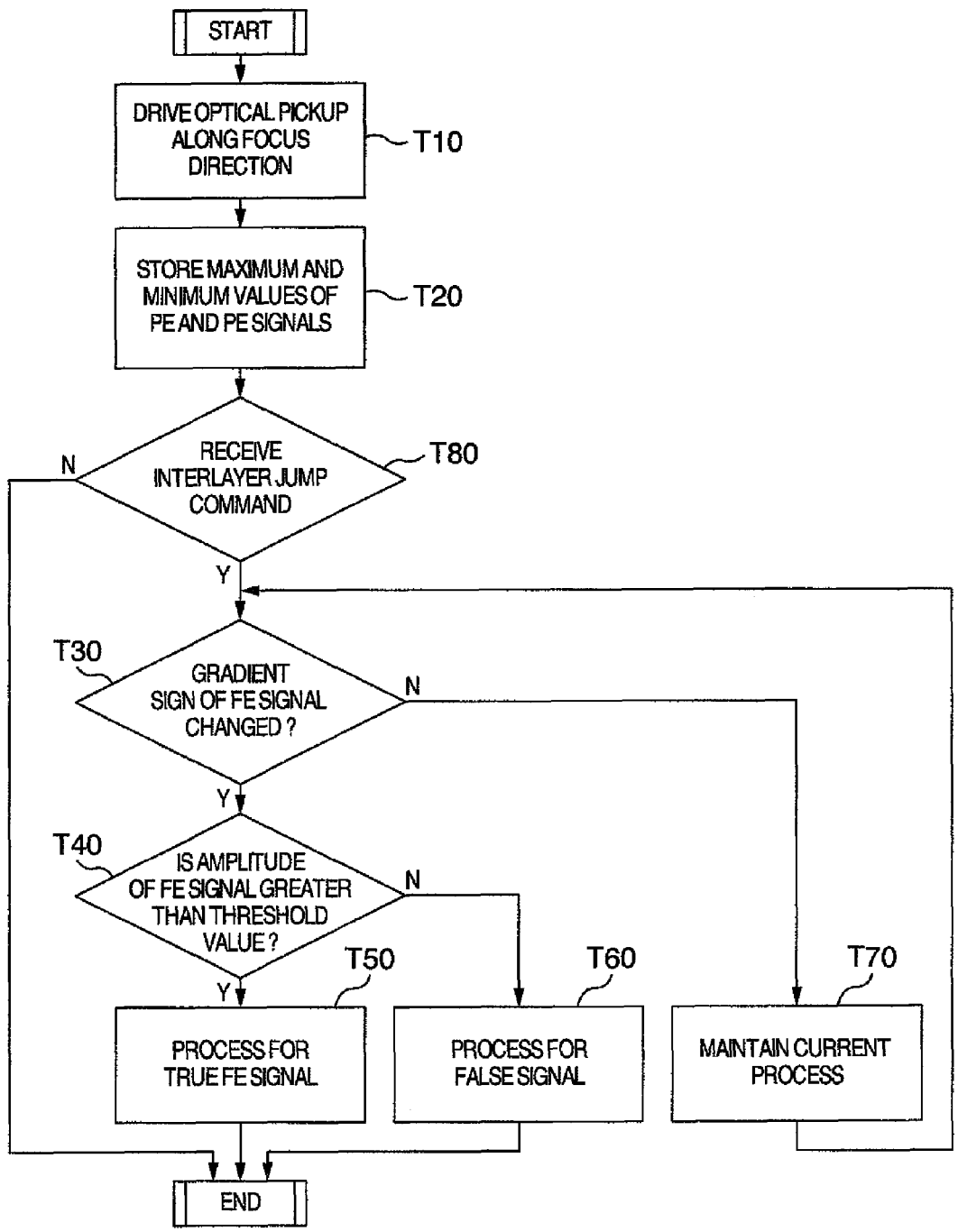
FIG. 12 is a flow chart illustrating the operation of the fourth embodiment.

With reference to the flow chart of FIG. 12 and operation waveforms of FIG. 13, description will be made on the process to be executed by the FE signal comparison circuit 23 with the memory 22.

First, at Step T10 the focus actuator 5 is driven to move the optical pickup along a focus direction (either a direction of moving toward the information plane or a direction of moving away from the information plane). Next, at Step T20 maximum and minimum values obtained from the waveform illustrated at (a) of FIG. 5 are stored in the memory 22. Next, at Step T80 upon reception of the interlayer jump command issued from the microcomputer 11, the interlayer jump pulse calculating circuit 15 and FE signal comparison circuit 23 start the interlayer jump process. The interlayer jump pulse calculating circuit 15 generates an acceleration pulse in accordance with a direction along which a desired layer to be interlayer-jumped exists.

Figure 13:
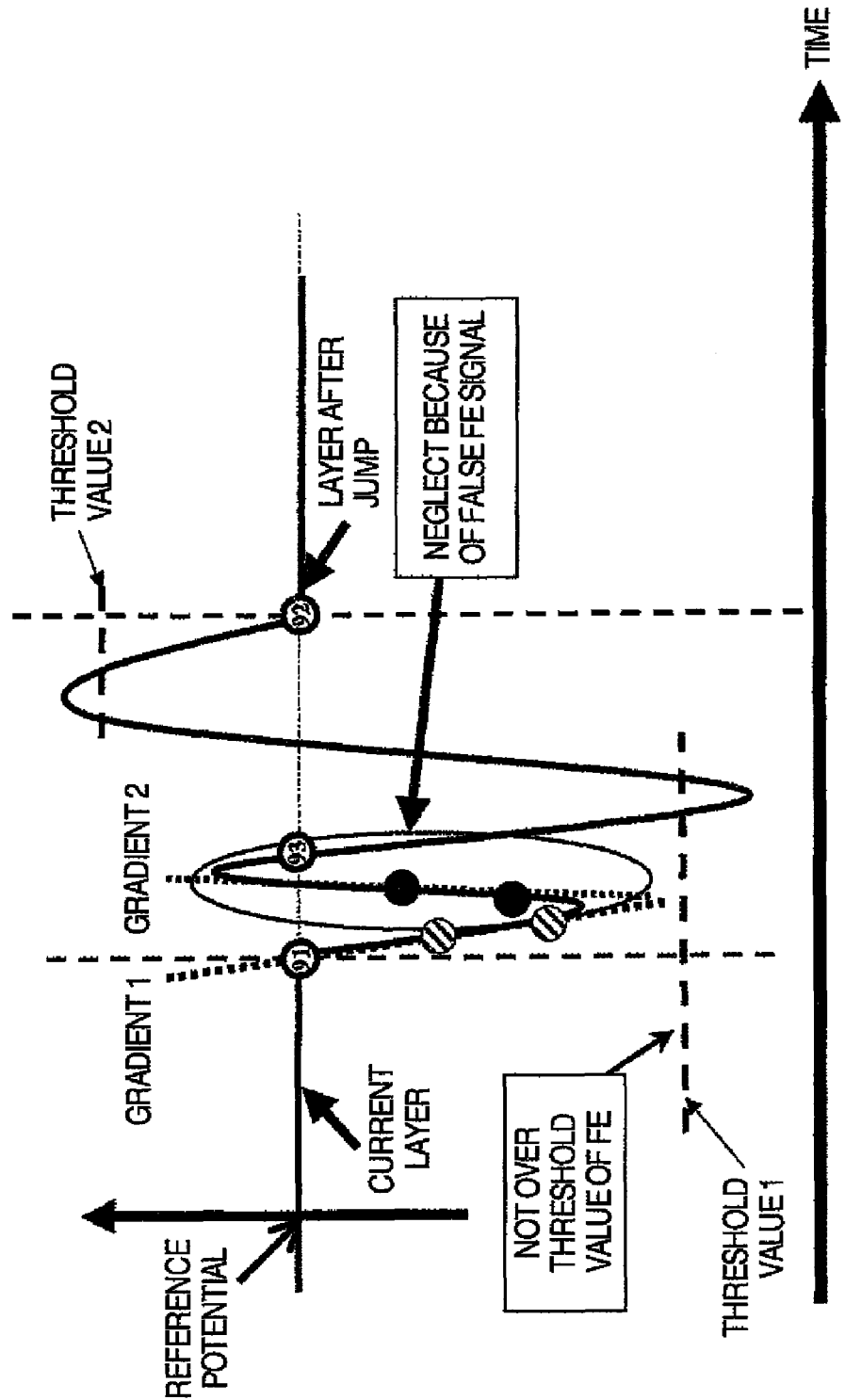
FIG. 13 is a diagram illustrating operation waveforms of the fourth embodiment.

As the interlayer jump process starts, an operation waveform illustrated in FIG. 13 is obtained. FIG. 13 illustrates the waveform of the FE signal generated by the FE signal calculating circuit 8. Next, at Step T30 the FE signal comparison circuit 23 detects whether a gradient sign of the FE signal changes from negative to positive (or from positive to negative). An example of a change of the gradient sign of the FE signal is indicated by a gradient 1 and a gradient 2 of the PE signal illustrated in FIG. 13.

If Yes at Step T30, the FE signal comparison circuit 23 transits to the process at Step T40.

At Step T40 the FE signal comparison circuit 23 detects whether a change amount of the FE signal from a focal point exceeds a threshold value 1 and the gradient sign changes. The process at Step T40 is executed at a point where the gradient sign of the FE signal illustrated in FIG. 13 changed. The threshold value 1 is determined in advance by the FE signal comparison circuit 23 from the maximum and minimum values of the PE signal stored in the memory 22 at Step T20. The threshold value 1 may be set to 80% of a minimum value of the FE signal relative to the reference potential, or to 80% of a maximum value. If Yes at Step T40, the flow transits to Step T50.

At Step T50 the FE signal comparison circuit 23 processes by using the obtained FE signal as a true FE signal.

On the other hand, if No at Step T40, the process transits to Step T60. At Step T60 the FE signal comparison circuit 23 processes by using the obtained FE signal as a false FE signal.

If a gradient sign of the FE signal does not change at Step T30, the current signal state is maintained at Step T70 until the gradient sign changes.

With the above processes, even if the gradient sign of the FE signal changes, if the PE signal does not cross the threshold value, in a range of interlayer jump from one information plane to an adjacent information plane, then the microcomputer 11 or focus control circuit 12 controls not to detect a zero cross point of the FE signal in this range as a focal position of the adjacent information plane.

With the processes described above, in jumping from a current layer 91 to the next layer 92 as illustrated in FIG. 13, interlayer jump to a desired layer becomes possible without erroneously jumping to an illusion layer 93 caused by a false signal, because an acceleration or deceleration pulse can be generated in accordance with a true FE signal, as indicated at (c) of FIG. 3.

This disk apparatus can be applied to various optical disks 1 including BD, HD, DVD, and CD. The interlayer jump pulse calculating circuit 15 and signal comparison circuit 10 may be realized by using the calculation function of the microcomputer 11. The timing when the maximum and minimum values of the FE and PE signals are stored in the memory 20 may be any time before interlayer jump, and this storage process is not required to be an independent process, but may be executed in common with another process. The memory 20 is not required to be an external memory, but may be realized, for example, by using a portion of an internal memory of the microcomputer 11.

[Fifth Embodiment]

Figure 14:
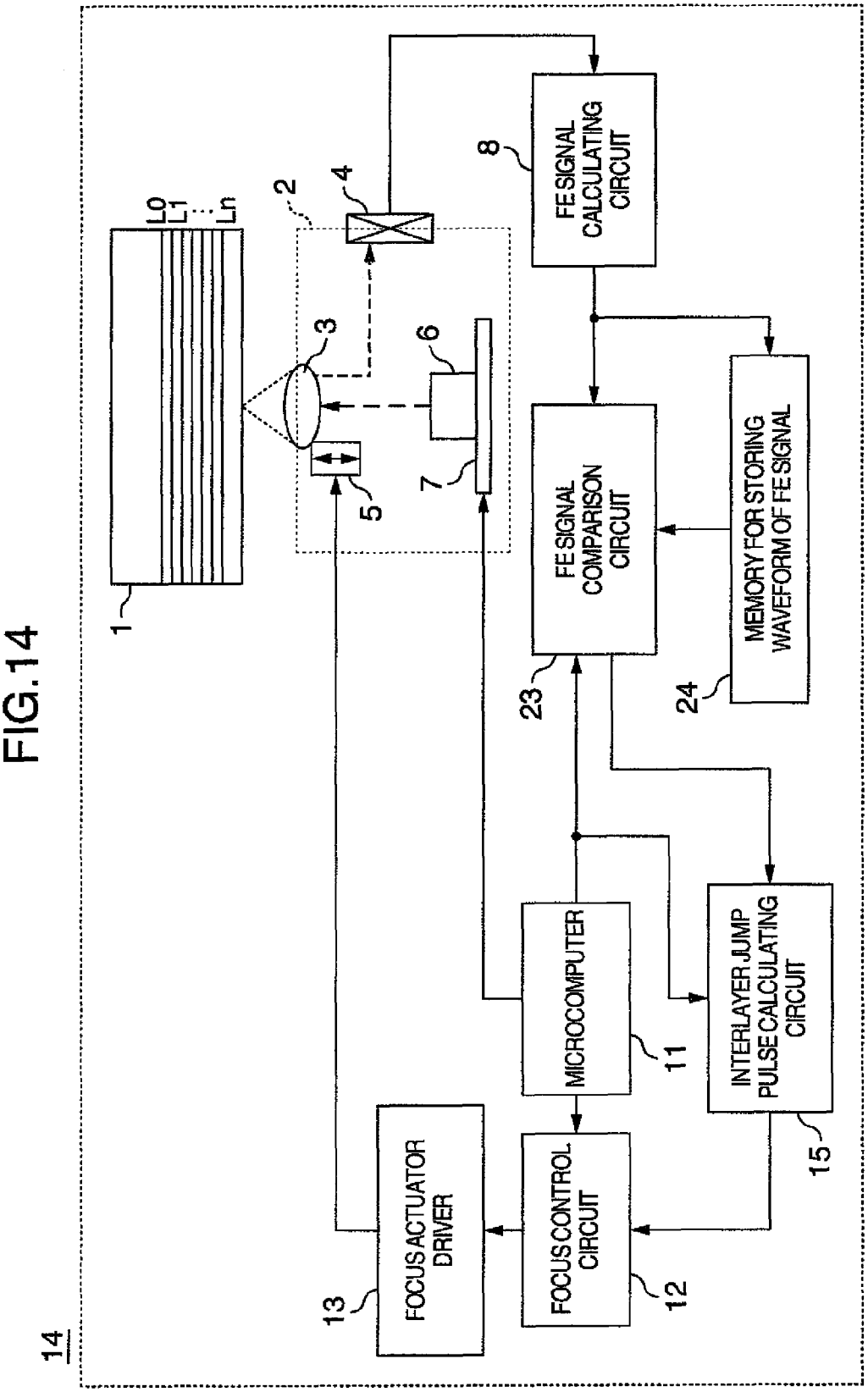
FIG. 14 is a block diagram illustrating an optical disk apparatus according to a fifth embodiment.

FIG. 14 is a bock diagram of an optical disk apparatus 14 of the fifth embodiment.

The optical disk apparatus 14 of the fifth embodiment stores a waveform of the FE signal generated by the FE signal calculating circuit 8 in a memory 24 for storing a waveform of the FE signal (hereinafter simply called memory 24). This embodiment is characterized in that interlayer jump is performed initially without using the waveform stored in the memory 24, and if the interlayer jump fails, interlayer jump is retried by the FE signal comparison circuit 23 which judges a desired layer from the zero cross point of the waveform stored in the memory 24. Interlayer jump may be performed initially by using the waveform stored in the memory 24.

Figure 15:
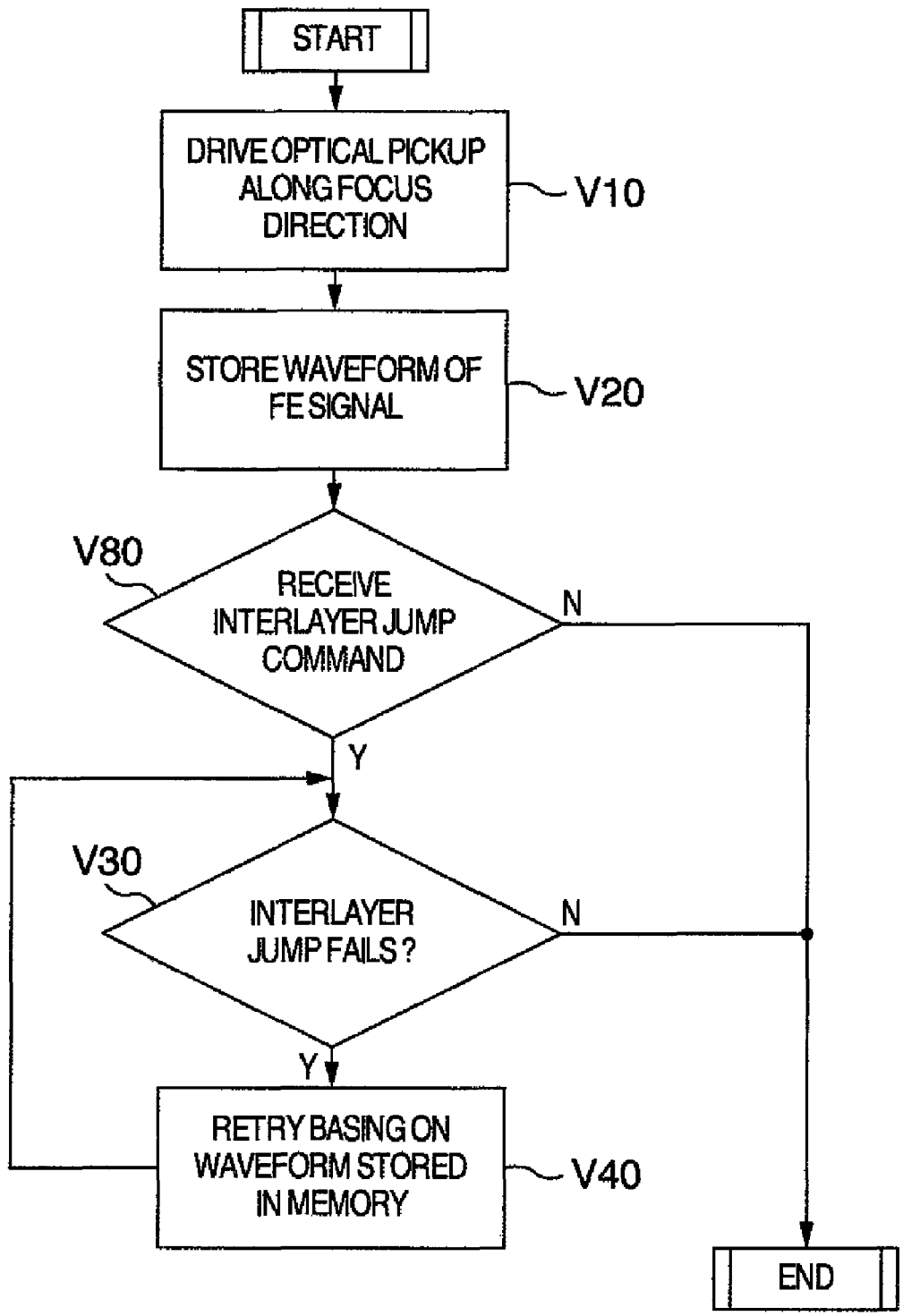
FIG. 15 is a flow chart illustrating the operation of the fifth embodiment.

FIG. 15 is a flow chart illustrating interlayer jump using the FE signal waveform stored in the memory 24.

First, at Step V10 the focus control circuit 12 drives the focus actuator 5 to move the optical pickup along a focus direction (either a direction of moving toward the information plane or a direction of moving away from the information plane). Next, at Step V20 a waveform of the FE signal generated by the FE signal calculating circuit 8 and illustrated in FIG. 16 is stored in the memory 24. Next, at Step V80 upon reception of the interlayer jump command issued from the microcomputer 11, the interlayer jump pulse calculating circuit 15 and FE signal comparison circuit 23 start the interlayer jump process. The interlayer jump pulse calculating circuit 15 generates an acceleration pulse in accordance with a direction along which a desired layer to be interlayer-jumped exists.

An initial interlayer jump at Step V30 (without using the waveform stored in the memory 24) fails because of false signals illustrated in FIG. 16. In this case, interlayer jump is retried at a retry process at Step V40. As illustrated in FIG. 17, interlayer jump from a current layer 51 to the next desired layer 55 can be succeeded by sequentially changing target zero cross points 52, 53, 54 and 55.

For example, if interlayer jump is performed by using the memory 24, gradients and the like of the FE and PE signals are required to be calculated, and a process time may increase. An increase in this process time may become wasteful if interlayer jump can be performed precisely without using the memory 24. In contract, the optical disk apparatus 14 of the embodiment can suppress an increase in the process time.

This disk apparatus can be applied to various optical disks 1 including BD, HD DVD, DVD, and CD. The interlayer jump pulse calculating circuit 15 and signal comparison circuit 10 may be realized by using the calculation function of the microcomputer 11. The timing when the waveform of the FE signal is stored in the memory 24 may be any time before interlayer jump, and this storage process is not required to be an independent process, but may be executed in common with another process. The memory 24 is not required to be an external memory, but may be realized, for example, by using a portion of an internal memory of the microcomputer 11.

According to the optical disk apparatus of each embodiment described above, interlayer jump can be performed without being influenced by a false signal to be caused by stray light and noises so that reliability of access during recording/reproducing can be improved. It is therefore possible to provide an optical disk apparatus capable of stable operation for optical disks having a variety of performances available in markets.

The present invention is not limited only to the above-described embodiment, but various modifications are possible. For example, the embodiments have been described in detail in order to make the present invention be understood easily, and the embodiments are not necessarily required to include all constituent elements described above. Further, a portion of an embodiment configuration may be replaced with a portion of another embodiment configuration. Furthermore, a portion of an embodiment configuration may be added to a portion of another embodiment configuration. Still further, a portion of an embodiment configuration may be added to, deleted from, or replaced with a portion of another embodiment configuration.

Further, a portion or whole of each configuration described above may be realized by hardware or may be realized by a program on a processor. Furthermore, control lines and data lines necessary for the description of the present invention are illustrated, and all these control lines and data lines are not necessarily required for products. It may be considered practically that almost all constituent elements are interconnected together.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disk apparatus for information recording/reproducing of an optical disk having two or more information planes, comprising:
    a radiation unit for irradiating a laser beam toward said optical disk;
    a motion unit for moving a focal point of said laser beam along a focus direction of said optical disk;
    a photodetector unit for detecting light returned from said optical disk;
    a focus error signal generator unit for generating a focus error signal from a signal obtained by said photodetector unit;
    a pull-in error signal generator unit for generating a total sum signal of signals obtained by said photodetector unit; and
    a focus control unit for controlling a focal point of said laser beam to move from one information plane to another information plane of said optical disk in accordance with said focus error signal;
    wherein said focus control unit controls to detect whether said laser beam is in-focus on said information plane, in accordance with gradients of said focus error signal and said pull-in error signal; and
    wherein said focus control unit controls in such a manner that a focal position of said information plane is not detected in accordance with said focus error signal, if a sign of the gradient of said focus error signal changes and a sign of the gradient of said pull-in error signal does not change, in a range where a focus of said laser beam is moved from one information plane to another adjacent information plane, whereas a focal position of said information plane is detected in accordance with said focus error signal, if a sign of the gradient of said focus error signal changes and a sign of the gradient of said pull-in error signal changes.

2. The disk apparatus according to claim 1, further comprising:
    a storage unit for storing maximum and minimum values of said focus error signal and said pull-in error signal obtained at a plurality of information planes of said optical disk; and
    a setting unit for setting threshold values of change amounts of said focus error signal and said pull-in error signal from an in-focus state, in accordance with the maximum and minimum values of said focus error signal and said pull-in signal stored in said storage unit,
    wherein said focus control unit controls in such a manner that a focal position of said information plane is not detected in accordance with said focus error signal, if a sign of the gradient of said focus error signal changes and a sign of the gradient of said pull-in error signal changes and if a signal change amount of said focus error signal from an in-focus state at a point where the sign of said focus error signal changes crosses said threshold value, in the range where a focus of said laser beam is moved from one information plane to another adjacent information plane.

3. The disk apparatus according to claim 1, further comprising:
    a storage unit for storing maximum and minimum values of said pull-in error signal obtained at a plurality of information planes of said optical disk; and
    a setting unit for setting threshold values of change amounts of said pull-in error signal from an in-focus state, in accordance with the maximum and minimum values of said pull-in signal stored in said storage unit,
    wherein said focus control unit controls in such a manner that a focal position of said information plane is not detected in accordance with said focus error signal, if a sign of the gradient of said focus error signal changes and a sign of the gradient of said pull-in error signal changes and if a signal change amount of said pull-in error signal from an in-focus state at a point where the sign of said pill-in error signal changes crosses said threshold value, in the range where a focus of said laser beam is moved from one information plane to another adjacent information plane.

4. The disk apparatus according to claim 1, further comprising:
    a storage unit for storing maximum and minimum values of said pull-in error signal obtained at a plurality of information planes of said optical disk; and
    a setting unit for setting threshold values of change amounts of said pull-in error signal from an in-focus state, in accordance with the maximum and minimum values of said pull-in signal stored in said storage unit,
    wherein said focus control unit controls in such a manner that a focal position of said information plane is not detected in accordance with said focus error signal, if a sign of the gradient of said focus error signal changes and a sign of the gradient of said pull-in error signal changes and if a signal change amount of said pull-in error signal from an in-focus state at a point where the sign of said pill-in error signal changes does not cross said threshold value, in the range where a focus of said laser beam is moved from one information plane to another adjacent information plane.

* * * * *